G. H. MARTING.
FUNNEL ATTACHMENT FOR MILK CANS.
APPLICATION FILED FEB. 8, 1909.

929,098.

Patented July 27, 1909.

Witnesses
Carl Stoughton
A. L. Phelps

Inventor
George H. Marting
By
C. C. Shepherd
Attorney

UNITED STATES PATENT OFFICE.

GEORGE H. MARTING, OF COLUMBUS, OHIO.

FUNNEL ATTACHMENT FOR MILK-CANS.

No. 929,098.  Specification of Letters Patent.  Patented July 27, 1909.

Application filed February 8, 1909. Serial No. 476,689.

*To all whom it may concern:*

Be it known that I, GEORGE H. MARTING, a citizen of the United States, residing at Columbus, in the county of Franklin and State of Ohio, have invented certain new and useful Improvements in Funnel Attachments for Milk-Cans, of which the following is a specification.

My invention relates to the improvement of funnel attachments for milk cans and has particular relation to that class of funnels which are adapted to be detachably connected with a milk receiving can and into which the milk is directed from the cow's udder.

Figure 1:
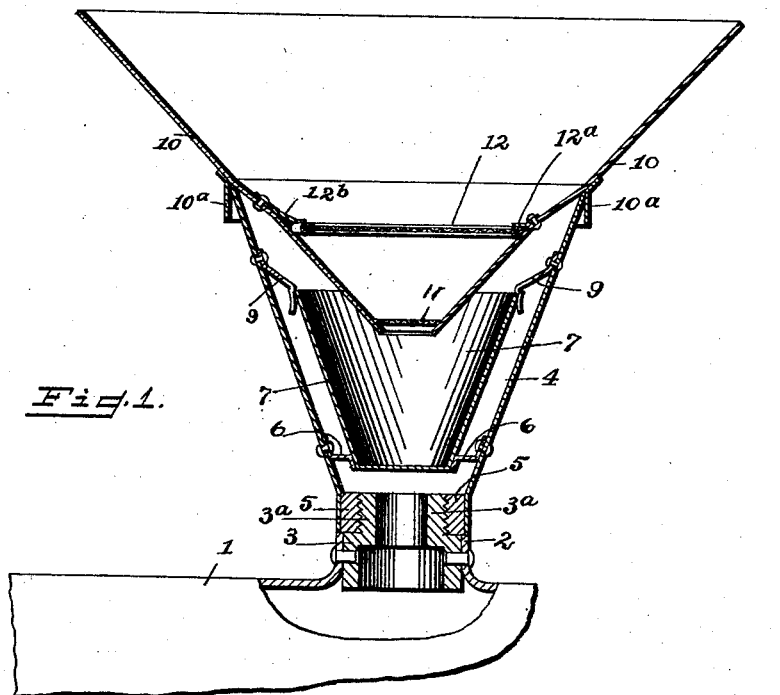
Figure 2:
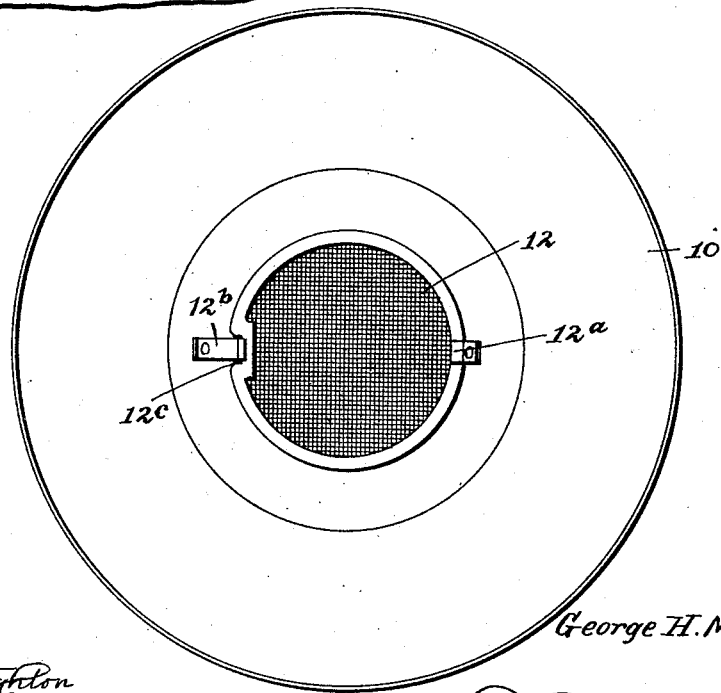

The objects of my invention are to provide a funnel of this class of superior construction and arrangement of parts; to so construct my improved funnel as to provide for the separation and collection of foreign matter or undesirable ingredients in the milk and to prevent such foreign matter entering the milk can; to so construct my improved funnel as to admit of its parts being readily separated and to produce other improvements the details of which will be more fully pointed out hereinafter. These objects I accomplish in the manner illustrated in the accompanying drawing, in which:

Figure 1 is a central vertical section of my improved funnel attachment showing the same connected with a portion of a milk can, and, Fig. 2 is a plan view of the same.

Similar numerals refer to similar parts throughout the several views.

1 represents a portion of a horizontally supported milk can, which is formed on its upper side with an opening, about which projects from the can a short neck 2. Into this neck is secured a tubular plug 3, the latter having a reduced outer portion $3^a$ which is externally threaded.

4 represents a funnel body, the lower reduced vertical end portion of which has secured therein an internally threaded ring 5 which is adapted to be screwed on to the threaded portion $3^a$ of the plug 3.

In the construction of the funnel member 4, I provide the same in its lower portion with internal angular brackets 6 which form a seat for the lower and smaller end portion of a vessel 7 which has its upper side open and which is of a truncated cone form. The upper portion of this vessel is further engaged by angular spring fingers 9, one end of each of which is secured to the inner surface of the member 4 and the inwardly projecting portions of which are shaped to engage the upper rim or marginal portion of said vessel 7 and thereby hold the latter against accidental displacement.

10 represents an upper funnel section of truncated cone form, this section at about the center of its height, bearing in the upper or mouth portion of the funnel section 4 and the reduced lower end of said section 10 extending, as shown, within the upper portion of the vessel 7. In constructing the member 10, I provide the same at about the center of its height with a vertical bend $10^a$, thus providing an angular recess at the junction of the upper portion of said bend and the body of the member 10, this recessed portion engaging the upper end portion of the member 4.

In the construction of the funnel section 10, I provide in the lower end portion thereof a fixed screen 11 and at a point above said fixed screen a horizontal detachable screen 12, the latter being held in place by having its marginal portion on one side engaging the underside of a fixed lip $12^a$ which projects from the inner surface of the member 10 and by having its marginal portion at a diametrically opposite point engage the underside of the free end of a spring strip $12^b$, the remaining end of which is connected with the inner surface of the member 10. To facilitate the engagement of the screen 12 and the end of the spring member $12^b$, I preferably recess the marginal portion of the screen frame as indicated at $12^c$, this recess permitting the outturned end of the spring strip $12^b$ to become disengaged from the screen frame when the latter is lifted or forced upward. Between the screens 12 and 11, I preferably provide cotton or other suitable straining or filtering material.

In the operation of milking, the milk is directed into the comparatively wide mouthed funnel member 10, from which it passes down through the screen 12 and through such filtering material as may be contained below said screen, thence through the screen 11 into the vessel or receptacle 7. When the latter has been thus filled, it is obvious that the overflow therefrom will pass downward about said vessel 7 and through the central opening of the plug $3^a$ into the can 1. By this operation, it will readily be understood that not only will the screens 12 and 11 serve to remove foreign matter from the milk, but that the vessel 7 will serve as a settling receptacle for the heavier particles of foreign matter, and that the milk which flows over the upper side of said receptacle, will in this manner, have been cleansed to a great extent of impurities.

As will readily be understood, the screen 12 may be readily lifted from its position in the member 10 for the purpose of cleaning the same or for cleaning the fixed screen below and when desired, the funnel member 10 may be raised out of its seat in the member 4 and completely disengaged from the latter. It is obvious that by pressing the spring members 9 outward, the vessel 7 may be readily removed from its position in the bracket 6.

What I claim, is:—

1. In a funnel attachment for milk cans, the combination with a main funnel section 4 adapted to be detachably connected with a milk can, of an upper removable funnel section 10 supported in said main funnel member, a screen in the lower end of said member 10, and a removable screen above said lower end screen.

2. In a funnel attachment for milk cans, the combination with a main funnel section adapted to be detachably connected with a milk can, and a vessel detachably mounted in said main funnel section, of an upper funnel section supported by and depending within said main funnel section, and a screen in said upper funnel section.

In testimony whereof I affix my signature in presence of two witnesses.

GEORGE H. MARTING.

Witnesses:
L. CARL STOUGHTON,
A. L. PHELPS.